(12) United States Patent
Droke

(10) Patent No.: US 10,722,821 B2
(45) Date of Patent: Jul. 28, 2020

(54) SEPARATION AND MONITORING APPARATUS

(71) Applicant: Green Flow Industries, LLC, Oklahoma City, OK (US)

(72) Inventor: David Droke, Elk City, OK (US)

(73) Assignee: Green Flow Industries, LLC, Oklahoma City, OK (US)

( * ) Notice: Subject to any disclaimer, the term of this patent is extended or adjusted under 35 U.S.C. 154(b) by 457 days.

(21) Appl. No.: 15/481,287

(22) Filed: Apr. 6, 2017

(65) Prior Publication Data

US 2017/0291123 A1  Oct. 12, 2017

Related U.S. Application Data

(60) Provisional application No. 62/319,969, filed on Apr. 8, 2016.

(51) Int. Cl.
| | |
|---|---|
| *B01D 19/02* | (2006.01) |
| *B01D 29/94* | (2006.01) |
| *E21B 21/06* | (2006.01) |
| *E21B 43/34* | (2006.01) |
| *B01D 19/00* | (2006.01) |

(52) U.S. Cl.
CPC ......... *B01D 19/02* (2013.01); *B01D 19/0042* (2013.01); *E21B 21/063* (2013.01); *E21B 43/34* (2013.01); *B01D 2201/265* (2013.01)

(58) Field of Classification Search
CPC ............... B01D 19/0042; B01D 19/02; B01D 2201/265; E21B 21/063; E21B 43/34
See application file for complete search history.

(56) References Cited

U.S. PATENT DOCUMENTS

| | | | |
|---|---|---|---|
| 6,328,118 B1 | 12/2001 | Karigan | |
| 7,575,073 B2 * | 8/2009 | Swartout | ............... E21B 21/065 175/209 |
| 2006/0162924 A1 | 7/2006 | Blevins | |
| 2007/0151907 A1 * | 7/2007 | Duhe | ........................ C02F 1/20 210/170.01 |
| 2009/0178978 A1 | 7/2009 | Beebe | |

FOREIGN PATENT DOCUMENTS

WO  2013022501 A1  2/2013

OTHER PUBLICATIONS

ISA/KR; International Search Report and Written Opinion; PCT/US2017/026633; dated Jul. 18, 2017; 15 pages.

* cited by examiner

*Primary Examiner* — Cabrena Holecek
(74) *Attorney, Agent, or Firm* — Hall Estill Law Firm

(57) ABSTRACT

A transportable separation apparatus for separating spent materials from oil and gas operations into a primarily solid component, a primarily liquid component and a primarily gas component. The transportable separation apparatus includes a first separation unit disposed on the transportable separation apparatus for receiving spent materials and beginning separation of the spent materials. The transportable separation apparatus connectable to a vehicle to be pulled on commercial roadways when the transportable separation apparatus is in a transportation configuration. The transportable separation apparatus further includes a second separation unit in fluid communication with the first separation unit for further separation of the spent materials. A method of using the transportable separation apparatus to separate spent materials.

20 Claims, 9 Drawing Sheets

SEPARATION AND MONITORING APPARATUS

CROSS-REFERENCE TO RELATED APPLICATIONS

The present application is a conversion of U.S. Provisional Application having U.S. Ser. No. 62/319,969, filed Apr. 8, 2016, which claims the benefit under 35 U.S.C. 119(e), the disclosures of which are hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a single, transportable separation and monitoring apparatus for efficiently separating spent materials recovered from oil and gas wells.

2. Description of the Related Art

Spent materials are generated at essentially all oil and gas well sites. Spent materials are typically comprised of solids, liquids and gases. In typical oil and gas operations many separate pieces of equipment are brought in to be able to separate spent materials into the various solid, liquid and gaseous components.

Accordingly, there is a need for a single and transportable apparatus that can separate spent materials into the separate solid, liquid and gaseous components.

SUMMARY OF THE INVENTION

The present disclosure is directed to a transportable separation apparatus for separating spent materials from oil and gas operations into a primarily solid component, a primarily liquid component and a primarily gas component. The transportable separation apparatus includes a first separation unit disposed on the transportable separation apparatus for receiving spent materials and beginning separation of the spent materials. The transportable separation apparatus is connectable to a vehicle to be pulled on commercial roadways when the transportable separation apparatus is in a transportation configuration. The transportable separation apparatus further includes a second separation unit in fluid communication with the first separation unit for further separation of the spent materials.

The present disclosure is further directed toward a method for separating spent materials recovered from oil and gas wells. The method includes introducing spent materials recovered from an oil and gas well to the transportable separation apparatus. The method also includes the step of separating the spent materials into a primarily gas component, a primarily liquid component and a primarily solid component.

DETAILED DESCRIPTION OF THE DISCLOSURE

Figure 7:
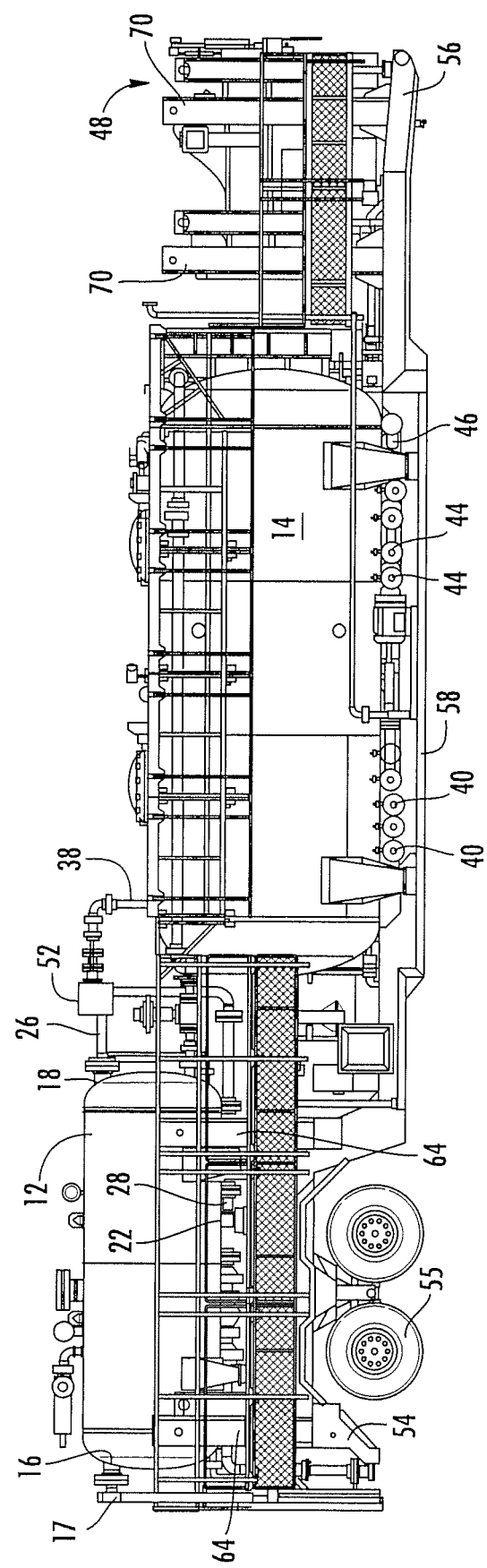
FIG. 7 is a side elevation view of the separation and monitoring apparatus in a secondary position and constructed in accordance with the present disclosure.
Figure 8:
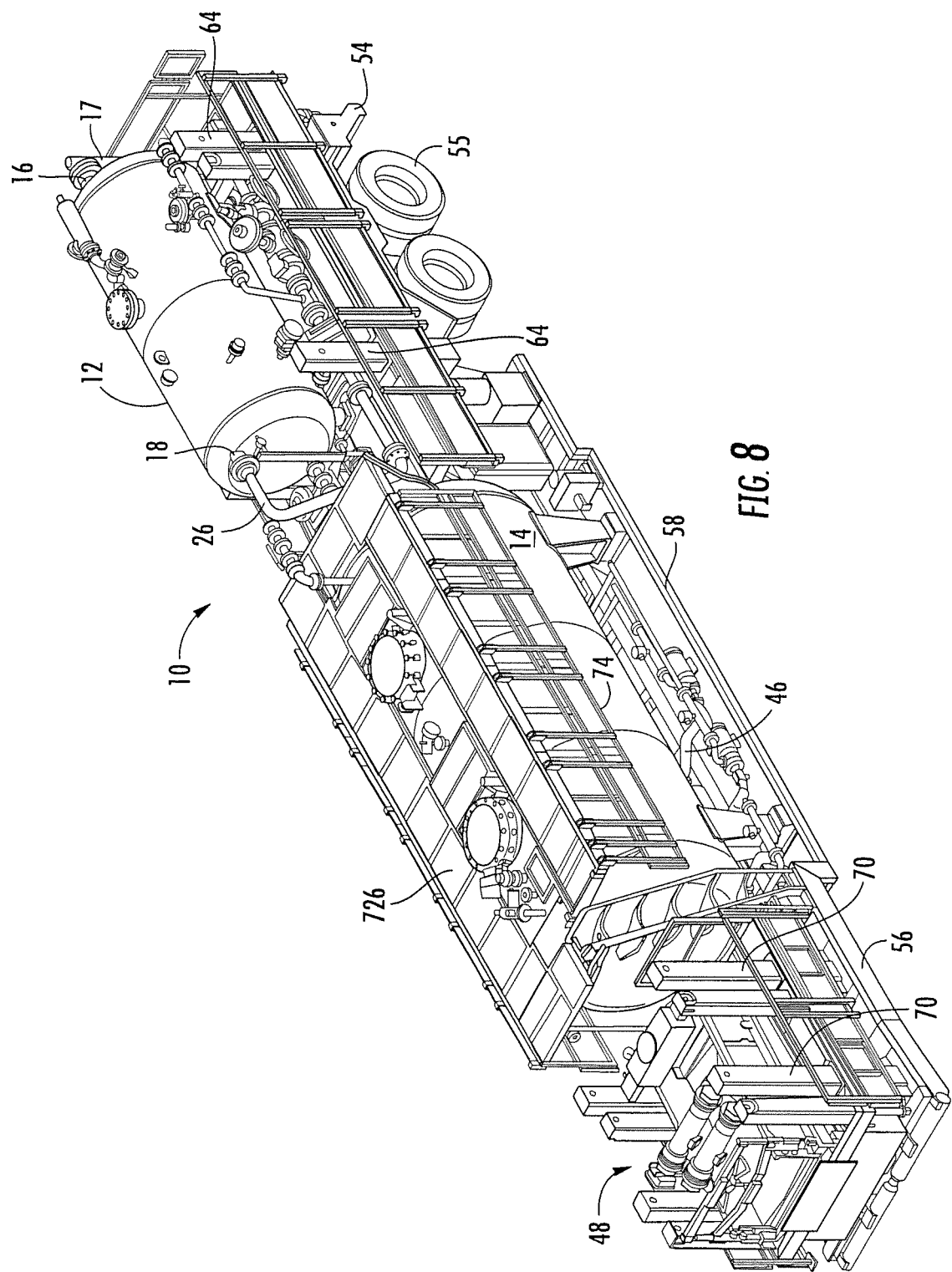
FIG. 8 is a perspective view of the separation and monitoring apparatus in the secondary position and constructed in accordance with the present disclosure.
Figure 9:
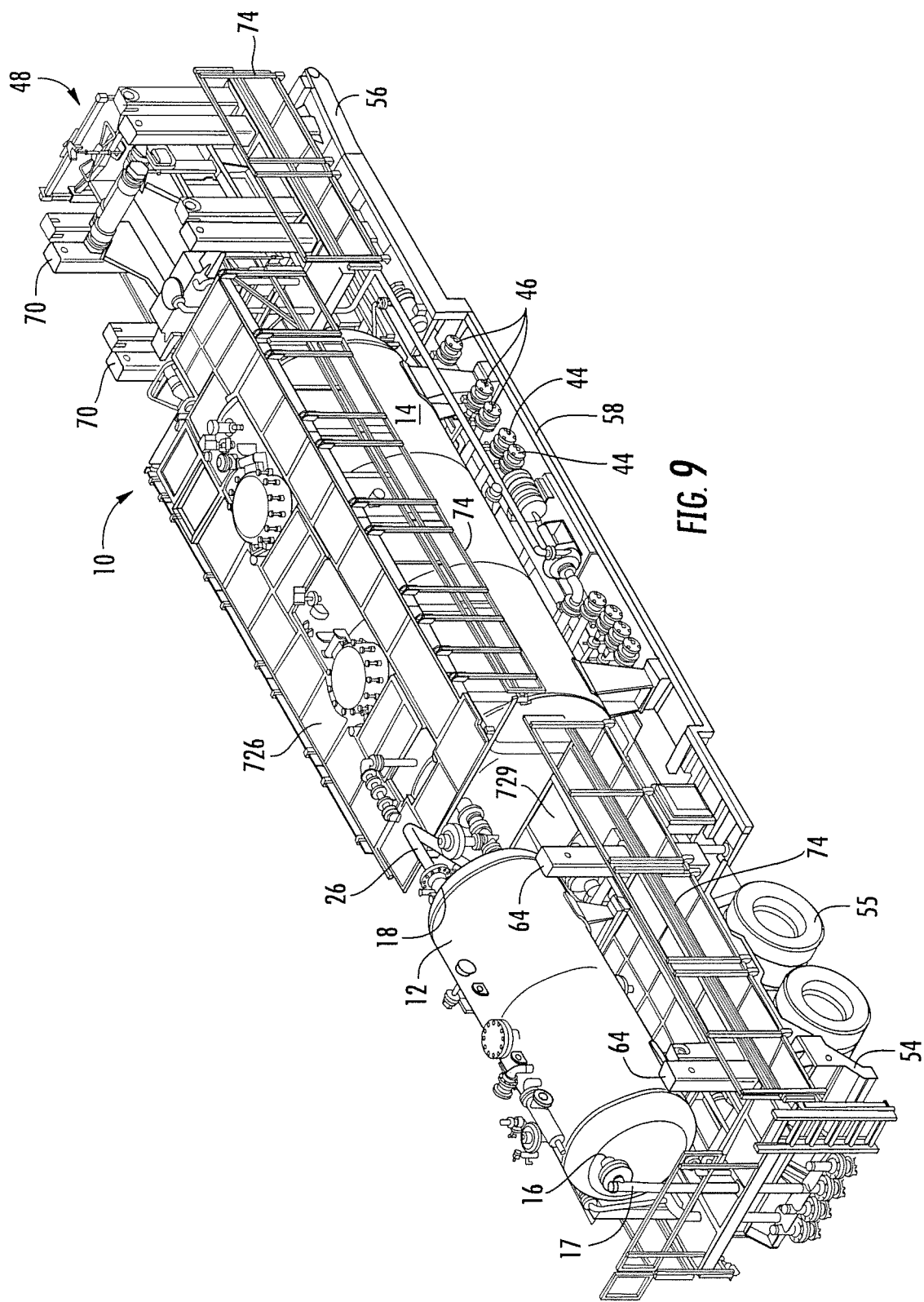
FIG. 9 is another perspective view of the separation and monitoring apparatus in the secondary position and constructed in accordance with the present disclosure.

The present disclosure relates to a single, transportable separation and monitoring apparatus 10 for efficiently separating spent materials recovered from oil and gas wells. The separation and monitoring apparatus 10 can have an operational configuration shown in FIGS. 1-6 and a transportable configuration shown in FIGS. 7-9. The spent materials recovered from oil and gas wells can be comprised of a solid component, a liquid component and a gaseous component. The separation and monitoring apparatus 10 described herein in its transportable configuration can be supported and incorporated into a single transportable apparatus, such as a trailer with wheels and an attachment apparatus for connecting to a vehicle to be pulled or towed on commercial roadways. In another embodiment, the separation and monitoring apparatus 10 can be mounted on a skid that can be loaded and unloaded from a trailer with wheels.

The separation and monitoring apparatus 10 includes a first separation unit 12 for receiving and beginning separation of the spent materials and a second separation unit 14 for further separation of the spent materials. The first separation unit 12 receives the spent materials via a materials inlet 16 (which is typically piping 17 connected to the first separation unit). The first separation unit 12 also includes a gas outlet 18 for allowing a first primarily gaseous component to be removed from the first separation unit 12, a liquid outlet 20 for allowing a primarily liquid component to be removed from the first separation unit 12, and a solids outlet 22 for allowing a first primarily solids component to be removed from the first separation unit 12. The separation and monitoring apparatus 10 can also include a liquid jet inlet 24 to assist in circulating the spent materials in the first separation unit 12, which permits more efficient separation of the spent materials.

In a further embodiment of the present disclosure, the first separation unit 12 includes a mist extractor 25 to assist in the separation of gases from liquids in the first separation unit 12. The mist extractor 25 can be placed anywhere in the first separation unit 12 such that it will come into contact with mist or foam and allow for the gaseous component of the mist or foam to be separated from the liquid component of the mist or foam. In one embodiment, the mist extractor 25 is positioned in an upper part of the first separation unit 12.

The liquid component is transported to the second separation unit 14 via a conduit 26 capable of handling the operational conditions of the liquid components. The first solids component is transported to the second separation unit 12 via a solids conduit 28. In one embodiment, the solids conduit 28 can be provided with a screen device 30 to prevent certain size solid particles from entering the second separation unit 14. The separation and monitoring apparatus 10 can also include a collection device 32 attached to the solids conduit 28 and disposed adjacent to the screen device 30 such that solids too large to pass through the screen device 30 will be collected in the collection device 32 for inspection.

In a further embodiment of the present disclosure, the first separation unit 12 includes weir elements 34 to assist in separating the spent materials. The first solids component can be removed from the first separation unit 12 prior to encountering the weir elements 34 and the first gaseous component and the liquid component can be removed from the first separation unit 12 after passing by the weir elements 34.

The second separation unit 14 includes a solids inlet 36 for receiving the first solids component from the first separation unit 12 and a liquid inlet 38 for receiving the liquid component from the first separation unit 12. The second separation unit 14 also includes a solids slurry outlet 40 for allowing a solids slurry to be removed from the second separation unit 14, a gas outlet 42 for removing an additional gaseous component from the spent materials, a water outlet 44 for removing a water component from the second separation unit 14 and an oil outlet 46 for removing an oil component from the second separation unit 14. The solids slurry will be transported to a third separation unit 48 (such as a shale shaker) to further refine the solid particles in the solids slurry.

In yet another embodiment, the second separation unit 14 includes weir elements 50 to assist in separating the spent materials. The solids slurry component can be removed from the second separation unit 14 prior to encountering the weir elements 50. The water component can be removed from the second separation unit 14 after the solids slurry outlet 40 and prior to the oil component. The water component can be removed between weir elements 50 in the second separation unit 14 and the oil component can be removed from the second separation unit 14 after passing by the weir elements 50 in the second separation unit 14. The water component is an aqueous component and not limited to water only. Similarly, the oil component is not comprised of only oil. The oil component can be primarily oil and other liquid hydrocarbons.

In a further embodiment, the separation and monitoring apparatus 10 includes a monitoring apparatus 52 (may be made up of multiple separate devices) to measure the first gaseous component escaping from the first separation unit 12 and the second gaseous component escaping from the second separation unit 14. Weights or volumes of gaseous components, the flowrates of the gaseous components, composition of the gaseous components can all be monitored and measured by the monitoring apparatus 52. The monitoring apparatus 52 can also measure the quantity of sand (primary solid component of the solid slurry component) in the solid slurry component.

When the separation and monitoring apparatus 10 is in the operational configuration, the first separation unit 12 is in a raised position above one end of the separation and monitoring apparatus 10 and the third separation unit 48 is in a raised position above the opposite end of the separation and monitoring apparatus 10. Similarly, when the separation and monitoring apparatus 10 is in the transportation configuration, the first separation unit 12 is in a lowered position above one end of the separation and monitoring apparatus 10 and the third separation unit 48 is in a lowered position above the opposite end of the separation and monitoring apparatus 10. It should be understood that certain conduits are disconnected or separated when the separation and monitoring apparatus 10 is in the transportation configuration. For example, the conduit that connects the liquid outlet 20 from the first separation unit 12 to the liquid inlet 38 of the second separation unit 14 is disconnected or separated when the separation and monitoring apparatus 10 is in the transportation configuration.

One end of the separation and monitoring apparatus 10 can be a wheeled end 54 and the other end of the separation and monitoring apparatus 10 is a hitch end 56. The wheel end 54 includes a plurality of wheels 55 to facilitate transportation of the apparatus 10 on roadways. The hitch end 56 is the end of the separation and monitoring apparatus 10 that is attachable to a vehicle for transporting the separation and monitoring apparatus 10. In one embodiment, the first separation unit 12 is positioned above the wheeled end 54 of the separation and monitoring apparatus 10 the third separation unit 48 is positioned above the hitch end 56 of the separation and monitoring apparatus 10.

The separation and monitoring apparatus 10 can include a platform portion 58 disposed between the wheel end 54 and the hitch end 56. The second separation unit 14 can be disposed on the platform portion 58. In one embodiment, the platform portion 58 can be positioned lower than wheel end 54 and the hitch end 56 of the separation and monitoring apparatus 10. The lower platform portion 58 allows the first separation unit 12 and the third separation unit 48 to be positioned higher than the second separation unit 14 to make separation of the spent drilling materials more efficient. In one embodiment, the first separation unit 12 is raised to a sufficient height such that the first separation unit 12 is positioned entirely above (higher height) the second separation unit 14. It should be understood and appreciated that the first separation unit 12 can be offset from the second separation unit 14 and still be above/higher than the second separation unit 14.

The first separation unit 12 can be secured to a support structure 60 that can be selectively raised and lowered adjacent to the wheel end 54 of the separation and monitoring apparatus 10, which selectively raises and lowers the first separation unit 12. The support structure 60 can raised and lowered over the wheel end 54 via any manner known in the art, such as via jacks, hydraulic lifts, pneumatic lifts, scissor lifts, and the like. In one embodiment, the support structure 60 can include a plurality of guide openings 62 disposed therein to receive guide posts 64 disposed vertically from the wheel end 54 of the separation and monitoring apparatus 10. The support structure 60 can be secured to the guide posts 64 at varying heights.

Figure 1:
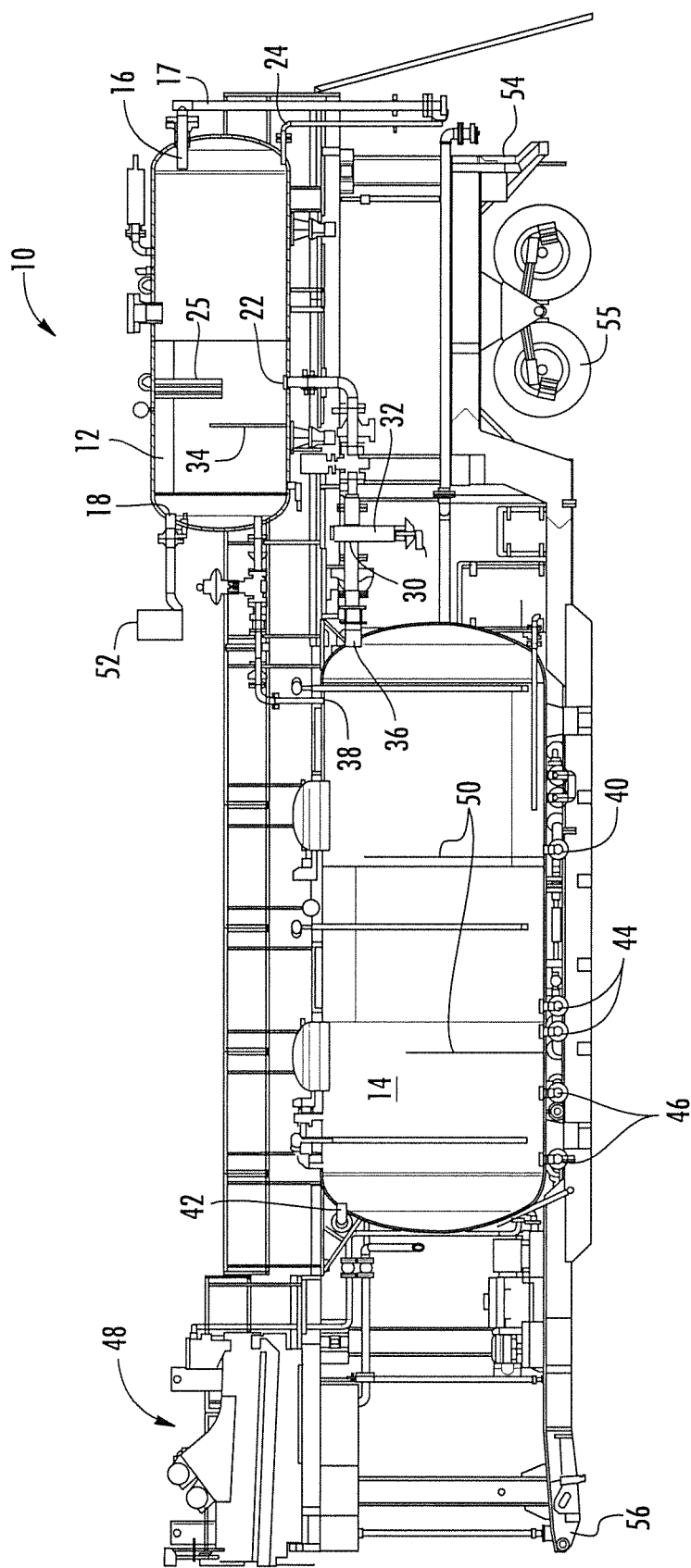
FIG. 1 is a cross sectional view of a separation and monitoring apparatus constructed in accordance with the present disclosure.
Figure 2:
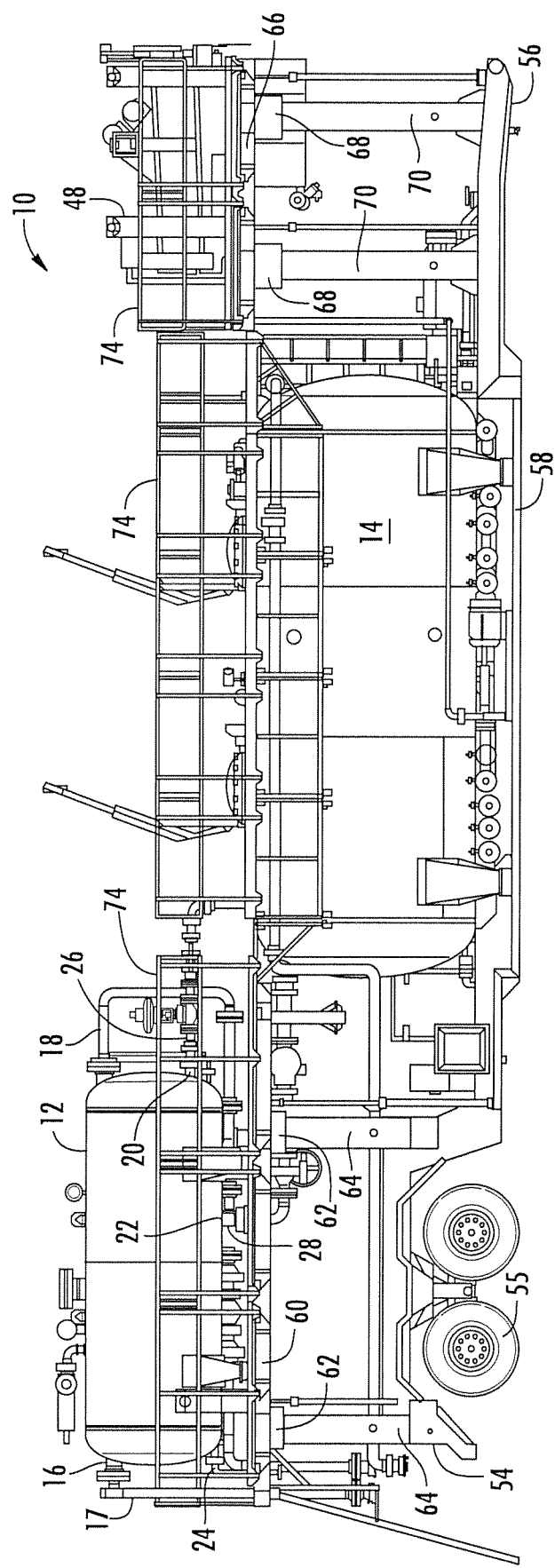
FIG. 2 is a side elevation view of the separation and monitoring apparatus constructed in accordance with the present disclosure.
Figure 3:
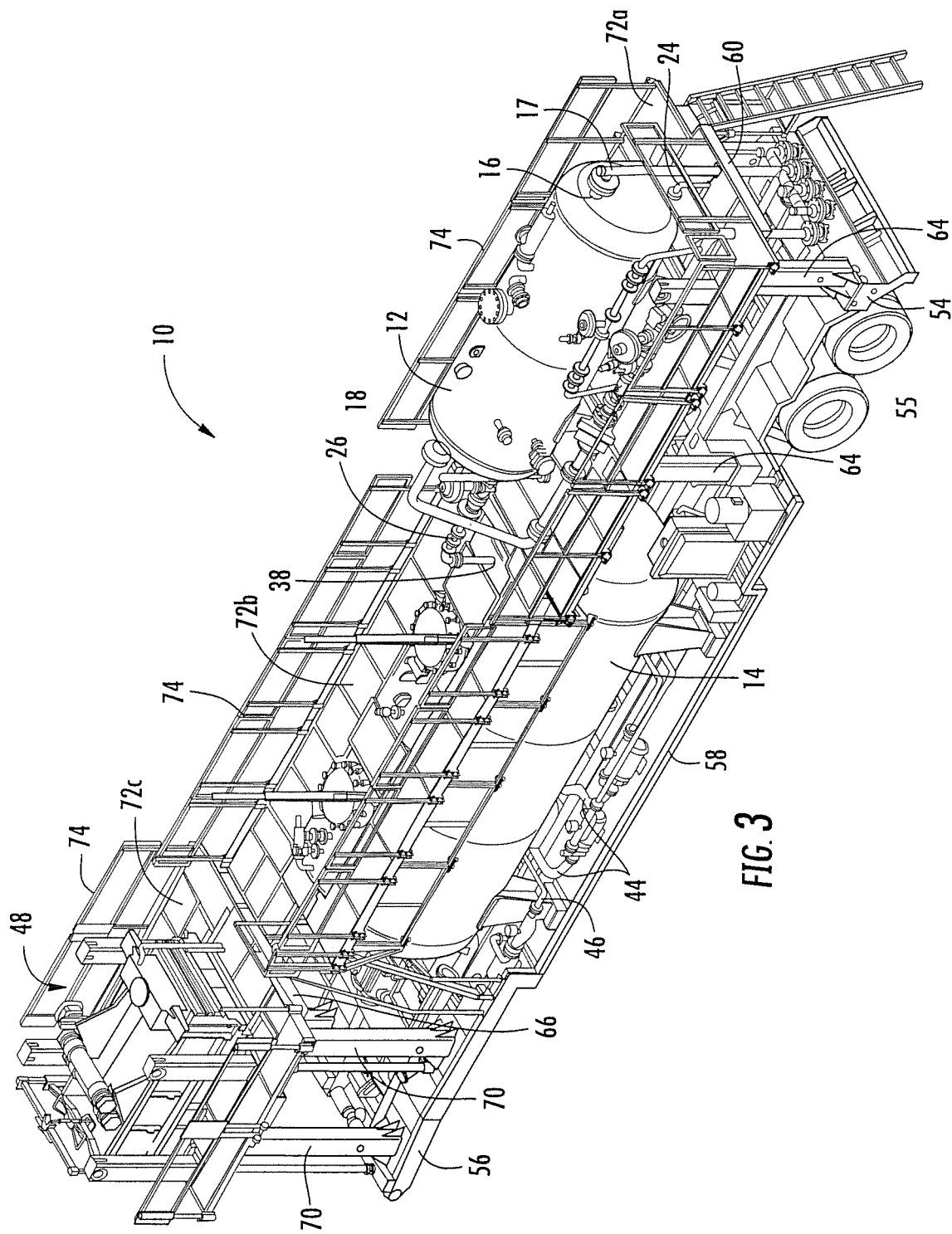
FIG. 3 is a perspective view of the separation and monitoring apparatus constructed in accordance with the present disclosure.
Figure 4:
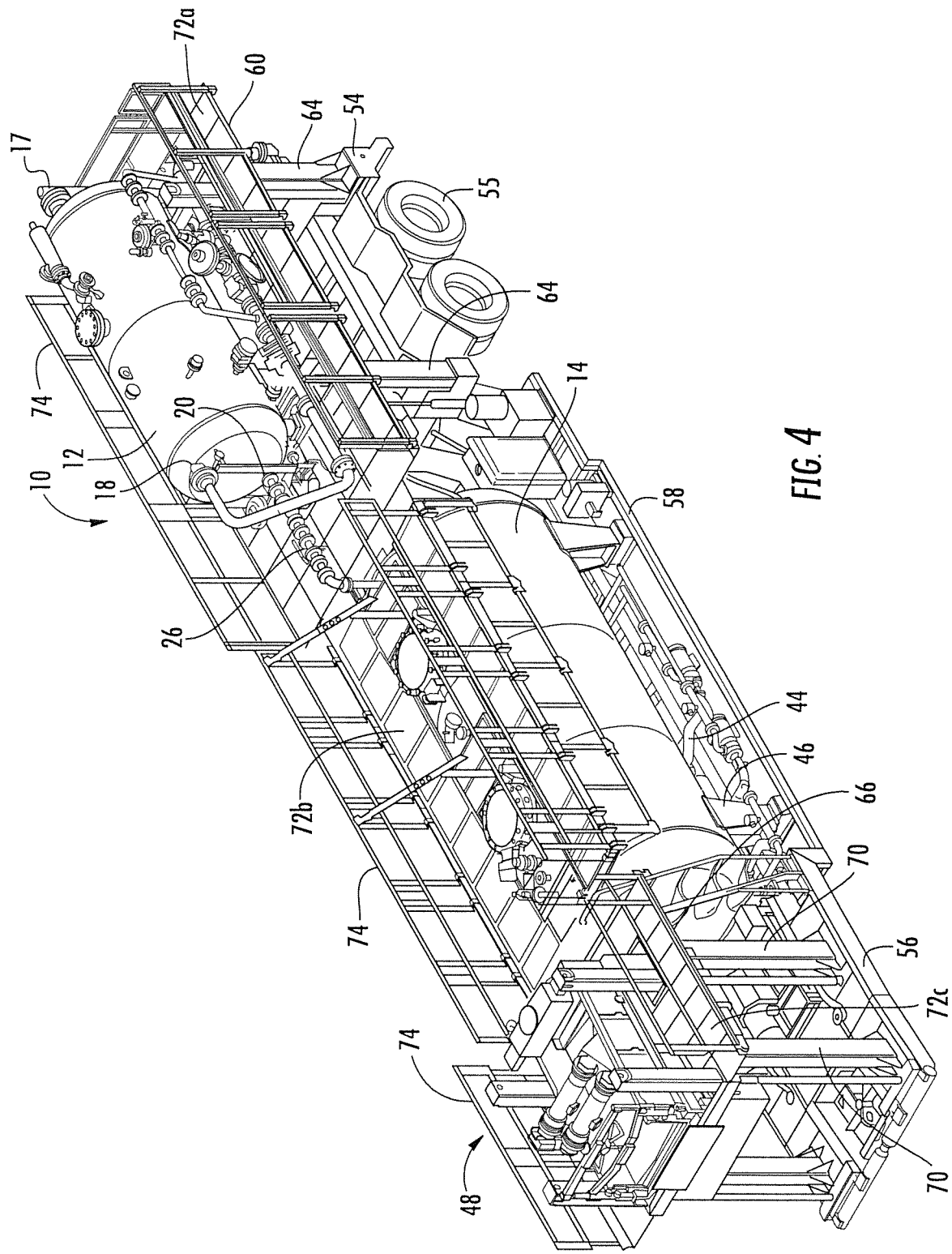
FIG. 4 is another perspective view of the separation and monitoring apparatus constructed in accordance with the present disclosure.
Figure 5:
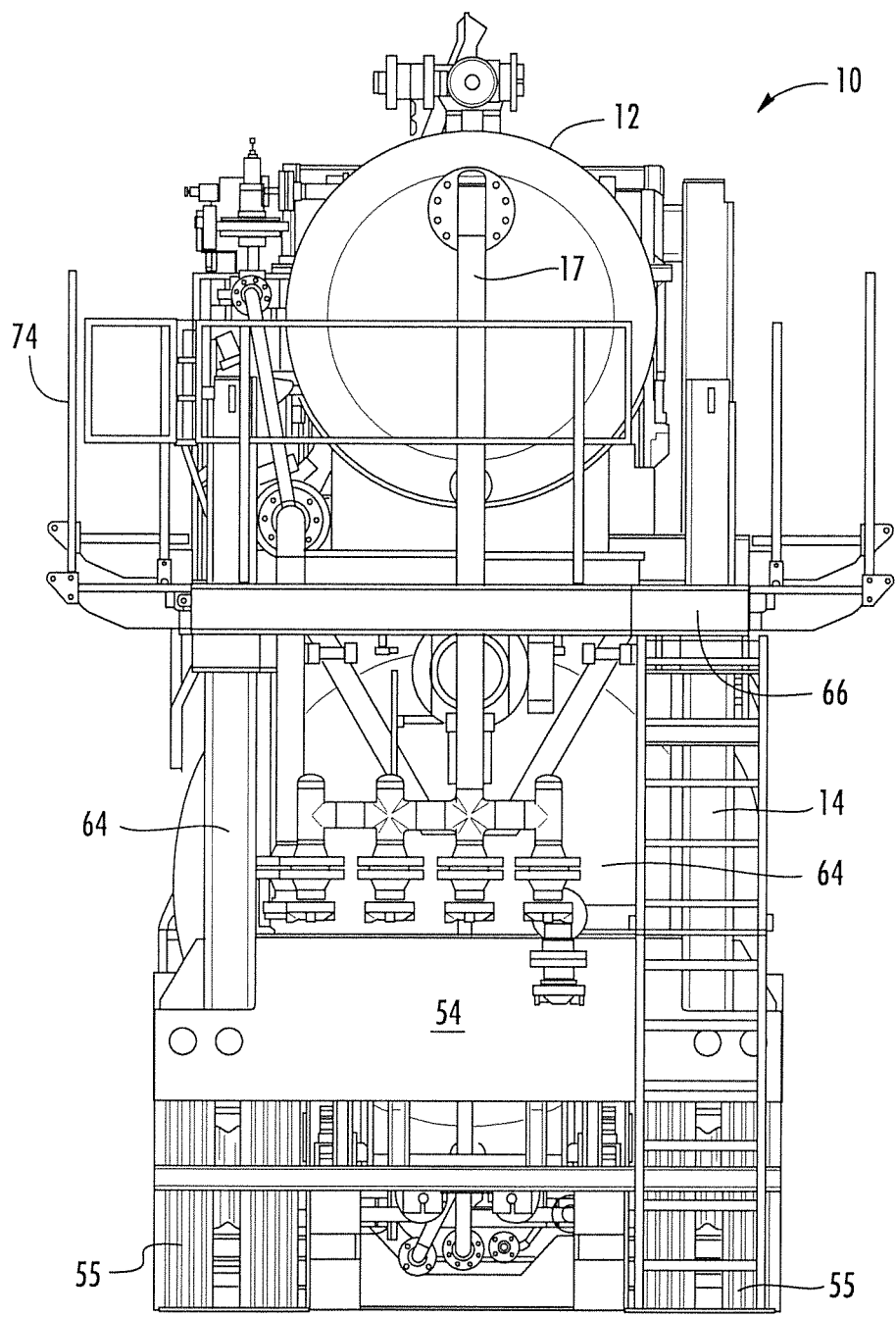
FIG. 5 is a rear elevation view of the separation and monitoring apparatus constructed in accordance with the present disclosure.
Figure 6:
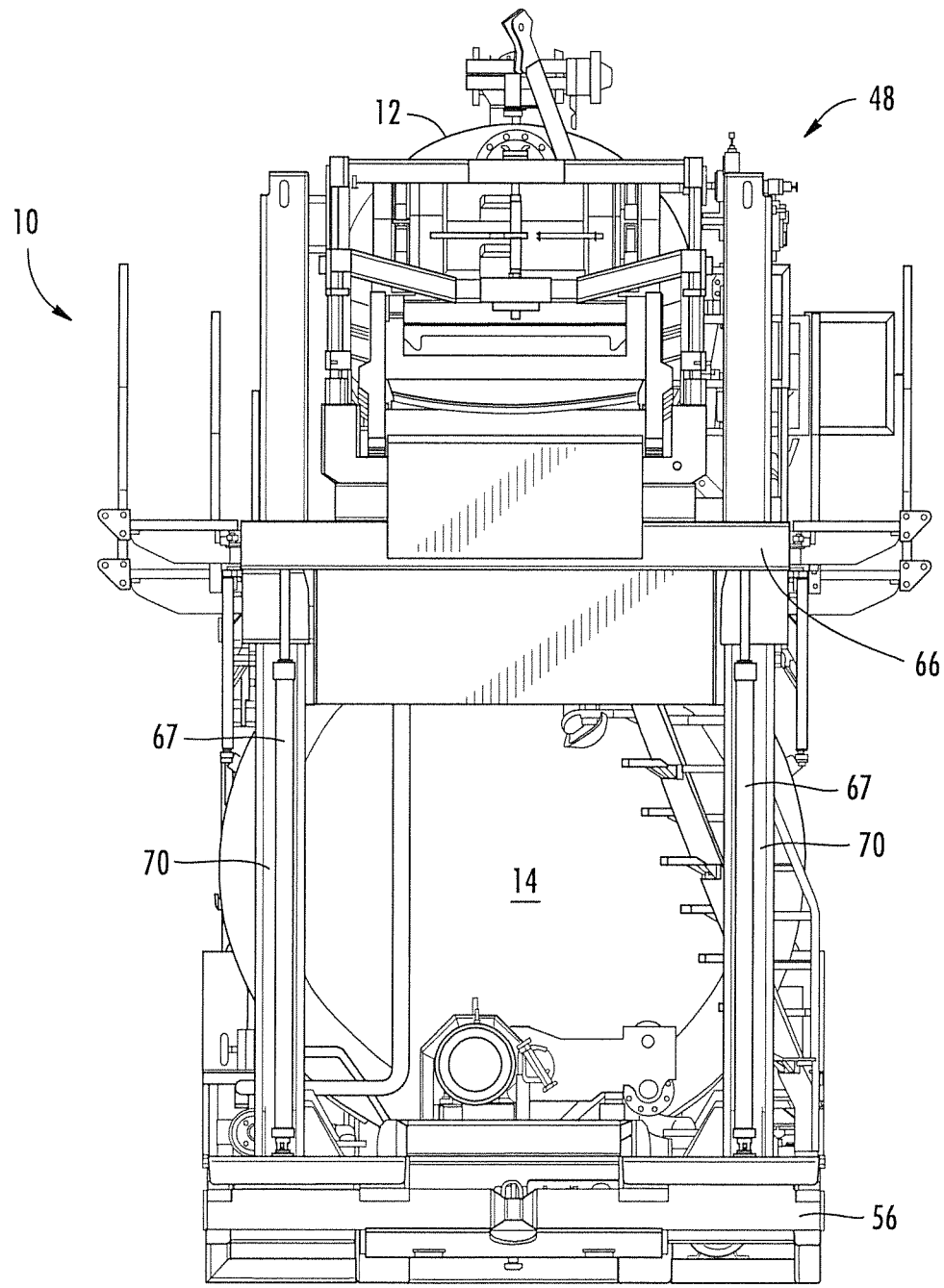
FIG. 6 is a front elevation view of the separation and monitoring apparatus constructed in accordance with the present disclosure.

The third separation unit 48 can be secured to a support structure 66 that can be selectively raised and lowered adjacent to the hitch end 56 of the separation and monitoring apparatus 10, which selectively raises and lowers the third separation unit 48. The support structure 66 can raised and lowered over the hitch end 56 via any manner known in the art, such as via jacks, hydraulic lifts, pneumatic lifts, scissor lifts, and the like. FIG. 6 shows hydraulic lifts 67 employed to raise the support structure 66. In one embodiment, the support structure 66 can include a plurality of guide openings 68 disposed therein to receive guide posts 70 disposed vertically from the hitch end 56 of the separation and monitoring apparatus 10. The support structure 66 can be secured to the guide posts 70 at varying heights.

The separation and monitoring apparatus 10 can further include walking platforms 72a, 72b, and 72c positioned adjacent to the first separation unit 12, the second separation unit 14 and the third separation unit 48, respectively. The walking platforms 72a and 72b can be disposed around and adjacent to lower portions of the first separation unit 12 and the third separation unit 48. The walking platform 72b can be disposed around and adjacent to an upper portion of the second separation unit 14. The separation and monitoring apparatus 10 can include hand rails 74 disposed around the platforms 72a, 72b and 72c for each separation unit 12, 14 and 48.

From the above description, it is clear that the present disclosure is well adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A transportable separation apparatus for separating spent materials from oil and gas operations into a primarily solid component, a primarily liquid component and a primarily gas component, the transportable separation apparatus comprising:
   a first separation unit disposed on the transportable separation apparatus for receiving spent materials and beginning separation of the spent materials, the transportable separation apparatus connectable to a vehicle to be pulled on commercial roadways when the transportable separation apparatus is in a transportation configuration;
   a mist extractor included in the first separation unit to support separation of mist or foam present in the spent materials into a gas component and a fluid component; and
   a second separation unit in fluid communication with the first separation unit for further separation of the spent materials.

2. The transportable separation apparatus of claim 1 where in the first separation unit includes a materials inlet for introducing the spent materials into the first separation unit, a gas outlet for permitting the primarily gas component to escape the first separation unit, a liquid outlet for permitting the primarily liquid component to escape the first separation unit and pass to the second separation unit, and a solids outlet for permitting the primarily solid component to escape the first separation unit.

3. The transportable separation apparatus of claim 1 wherein the first and second separation units include weir elements to facilitate the separation of the primarily solids component from the primarily liquid component of the spent materials and to facilitate the separation of an oil component from an aqueous component present in the primarily solids component.

4. The transportable separation apparatus of claim 1 further comprising:
   a screen device disposed in a solids conduit for preventing certain sized solid particles from entering the second separation unit, the solids conduit in fluid communication with the first and second separation unit to transport the primarily solid component of the spent materials from the first separation unit to the second separation unit; and
   a collection device attached for the solids conduit to capture the certain sized particles that are too large to pass through the screen device.

5. The transportable separation apparatus of claim 1 wherein the second separation unit includes a solids inlet for receiving the primarily solids component from the first separation unit, a liquid inlet for receiving the primarily liquid component from the first separation unit, a gas outlet for permitting any residual gas component to escape the second separation unit, an aqueous outlet for permitting a primarily aqueous component of the primarily liquid components from the first separation unit to escape the second separation unit, an oil outlet for permitting a primarily oil component of the primarily liquid components from the first separation unit to escape the second separation unit and a solids slurry outlet for permitting a further refined primarily solid component to escape the second separation unit.

6. The transportable separation apparatus of claim 1 further comprising a monitoring apparatus to measure the primarily gas component recovered from the first and second separation units and to measure a solid component of the primarily solid component recovered from the second separation unit.

7. The transportable separation apparatus of claim 1 wherein the transportable separation apparatus further comprises a third separation unit for refinement of the primarily solid component, the third separation unit receiving the primarily solid component of the spent materials from the first separation unit or the second separation unit.

8. The transportable separation apparatus of claim 7 wherein the third separation unit is a shale shaker.

9. The transportable separation apparatus of claim 1 wherein the transportable separation apparatus has an operational configuration, the first separation unit selectively raisable from its position on the transportable separation apparatus when the transportable separation apparatus is in the transportation configuration, the first separation unit raisable to a height higher than the second separation unit.

10. The transportable separation apparatus of claim 9 wherein the transportable separation apparatus includes a third separation unit that is selectively raisable from its position on the transportable separation apparatus when the transportable separation apparatus is in the transportation configuration, the third separation unit raisable to a height higher than the second separation unit.

11. The transportable separation apparatus of claim 9 wherein the entire first separation unit is disposed above the entire second separation unit.

12. A transportable separation apparatus for separating spent materials from oil and gas operations into a primarily solid component, a primarily liquid component and a primarily gas component, the transportable separation apparatus comprising:
   a first separation unit disposed on the transportable separation apparatus for receiving spent materials and beginning separation of the spent materials, the transportable separation apparatus connectable to a vehicle to be pulled on commercial roadways when the transportable separation apparatus is in a transportation configuration;

a second separation unit in fluid communication with the first separation unit for further separation of the spent materials;

a screen device disposed in a solids conduit for preventing certain sized solid particles from entering the second separation unit, the solids conduit in fluid communication with the first and second separation unit to transport the primarily solid component of the spent materials from the first separation unit to the second separation unit; and a collection device attached for the solids conduit to capture the certain sized particles that are too large to pass through the screen device.

13. The transportable separation apparatus of claim 12 where in the first separation unit includes a materials inlet for introducing the spent materials into the first separation unit, a gas outlet for permitting the primarily gas component to escape the first separation unit, a liquid outlet for permitting the primarily liquid component to escape the first separation unit and pass to the second separation unit, and a solids outlet for permitting the primarily solid component to escape the first separation unit.

14. The transportable separation apparatus of claim 12 wherein the first and second separation units include weir elements to facilitate the separation of the primarily solids component from the primarily liquid component of the spent materials and to facilitate the separation of an oil component from an aqueous component present in the primarily solids component.

15. The transportable separation apparatus of claim 12 wherein the transportable separation apparatus further comprises a third separation unit for refinement of the primarily solid component, the third separation unit receiving the primarily solid component of the spent materials from the first separation unit or the second separation unit.

16. The transportable separation apparatus of claim 15 wherein the third separation unit is a shale shaker.

17. The transportable separation apparatus of claim 12 wherein the transportable separation apparatus has an operational configuration, the first separation unit selectively raisable from its position on the transportable separation apparatus when the transportable separation apparatus is in the transportation configuration, the first separation unit raisable to a height higher than the second separation unit.

18. The transportable separation apparatus of claim 17 wherein the transportable separation apparatus includes a third separation unit that is selectively raisable from its position on the transportable separation apparatus when the transportable separation apparatus is in the transportation configuration, the third separation unit raisable to a height higher than the second separation unit.

19. The transportable separation apparatus of claim 17 wherein the entire first separation unit is disposed above the entire second separation unit.

20. A transportable separation apparatus for separating spent materials from oil and gas operations into a primarily solid component, a primarily liquid component and a primarily gas component, the transportable separation apparatus comprising:

a first separation unit disposed on the transportable separation apparatus for receiving spent materials and beginning separation of the spent materials, the transportable separation apparatus connectable to a vehicle to be pulled on commercial roadways when the transportable separation apparatus is in a transportation configuration;

a second separation unit in fluid communication with the first separation unit for further separation of the spent materials; and wherein the second separation unit includes a solids inlet for receiving the primarily solids component from the first separation unit, a liquid inlet for receiving the primarily liquid component from the first separation unit, a gas outlet for permitting any residual gas component to escape the second separation unit, an aqueous outlet for permitting a primarily aqueous component of the primarily liquid components from the first separation unit to escape the second separation unit, an oil outlet for permitting a primarily oil component of the primarily liquid components from the first separation unit to escape the second separation unit and a solids slurry outlet for permitting a further refined primarily solid component to escape the second separation unit.

* * * * *